United States Patent [19]

Slattery

[11] Patent Number: 4,971,532

[45] Date of Patent: Nov. 20, 1990

[54] OIL METERING PUMP WITH AIR PURGE

[75] Inventor: Gordon C. Slattery, Omro, Wis.

[73] Assignee: Brunswick Corporation, Skokie, Ill.

[21] Appl. No.: 360,265

[22] Filed: Jun. 2, 1989

[51] Int. Cl.[5] .......... F05B 7/06

[52] U.S. Cl. .......... 417/435; 417/500; 184/33; 184/35; 184/27.1

[58] Field of Search .......... 417/435, 500; 184/33, 184/35, 27.1

[56] References Cited

U.S. PATENT DOCUMENTS

| | | | |
|---|---|---|---|
| 1,254,799 | 1/1918 | Harley | 184/33 |
| 2,104,590 | 1/1938 | Hill | 417/500 |
| 4,034,830 | 7/1977 | Mukai et al. | 184/33 |
| 4,036,326 | 7/1977 | Mukai et al. | 184/33 |
| 4,043,711 | 8/1977 | Seino | 417/500 |
| 4,231,716 | 11/1980 | Kubota et al. | 417/500 |
| 4,787,832 | 11/1988 | Fukasawa et al. | 417/500 |
| 4,797,073 | 1/1989 | Kubota et al. | 417/500 |

OTHER PUBLICATIONS

Mercury Marine, Brunswick Corp., Outboard Service Training Notebook, 90-90592, p. 109, 1986.

*Primary Examiner*—A. Michael Chambers

*Attorney, Agent, or Firm*—Andrus, Sceales, Starke and Sawall

[57] ABSTRACT

A mechanical lubricating oil pump (126) includes a pump body (140) having a cylindrical chamber (142) and a reservoir (150) with an oil supply input (196) supplying oil from an oil tank (114) to the reservoir. A cylindrical rotator (144) is driven by a gear (162) and has a bore (146) receiving a piston (152) axially reciprocal therein and has a radial opening (148) in a cylindrical sidewall thereof communicating with the bore (146). The pump body (140) has an oil and air purge input first passage (168) communicating between the top of the reservoir (150) and the radial opening (148) in the rotator (144) during a first stroke at a first position of the rotator (144) during its revolution. The pump body (140) has an oil and air purge output second passage (180) communicating between a purge outlet (182) and the radial opening (148) in the rotator (144) during a second stroke at a second position of the rotator (144). The pump body (140) has an oil metering input third passage (186) communicating between the bottom of the reservoir (150) and the radial opening (148) in the rotator (144) during a third stroke at a third position of the rotator (144). The pump body (140) has an oil metering output fourth passage (188) communicating between a metered oil outlet (190) and the radial opening (148) in the rotator (144) during a fourth stroke at a fourth position of the rotator (144). Cams (192 and/or 2) cam the piston (152) and/or the rotator (144) to cause relative movement therebetween along the noted plurality of axial travel strokes changing the volume of the bore (146) during each revolution of the rotator (144). Differential stroking is provided to afford longer first and second strokes purging oil, and air if present, and shorter third and fourth strokes metering oil to an engine.

43 Claims, 10 Drawing Sheets

164
162
160
148
144
146
152
154
156
192
158
159
159a
142
150
186
190
178
126
176
196
182
140
200
214
208
206
202
198
212
204

168
192
152
216
156

METERING
OUTLET
190

178
168
184
148
180
146
188
140
144
186
182
PURGE
OUTLET

METERING OUTLET
190

140
156
206
196
182
OIL INPUT
PURGE
OUTLET

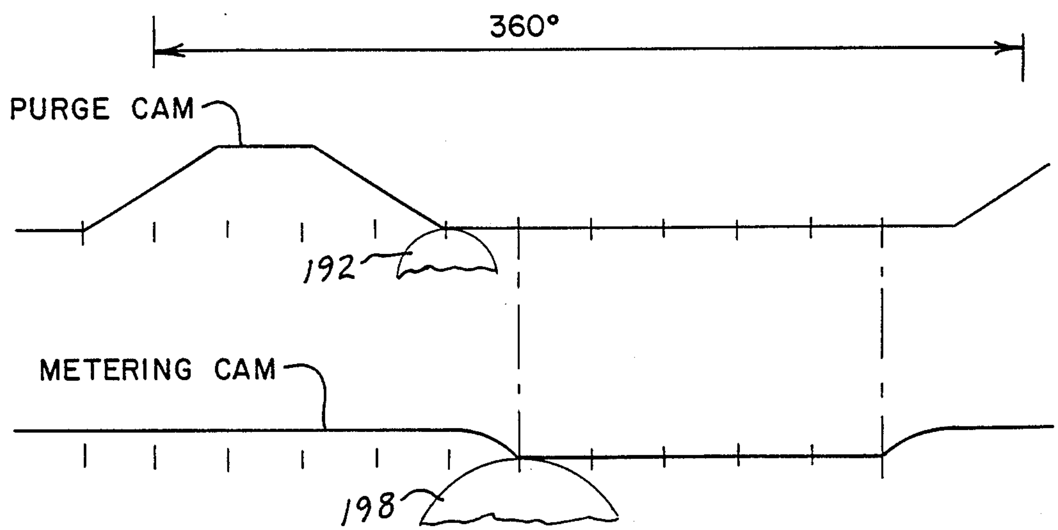
FIG. 35
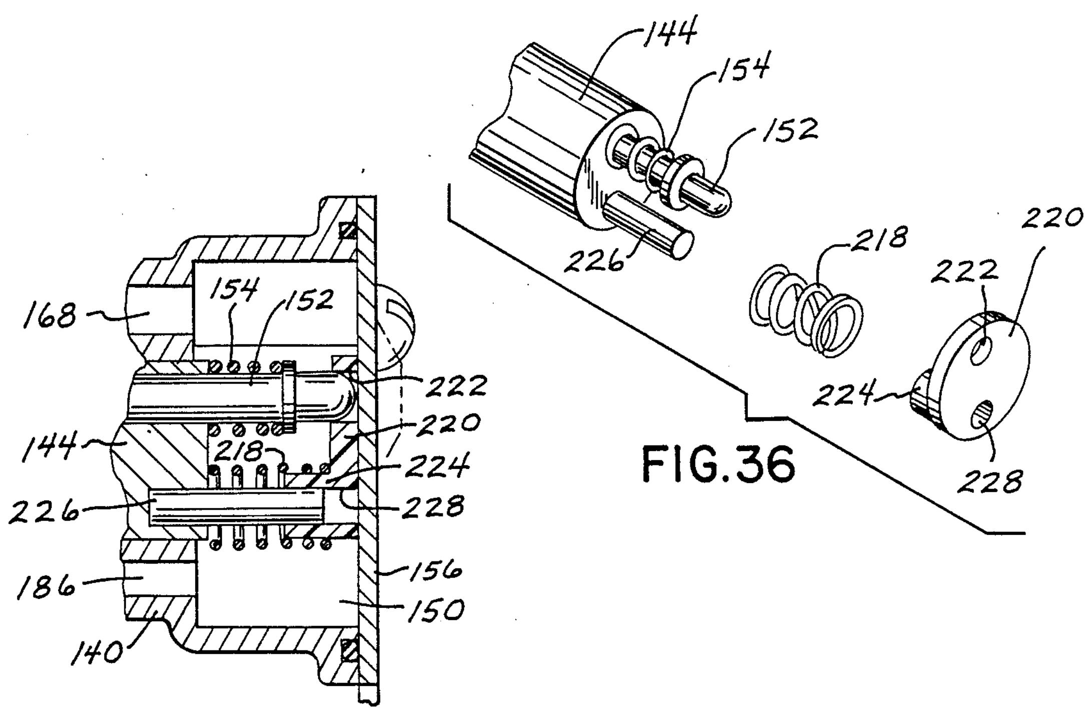
FIG. 37
FIG. 36

OIL METERING PUMP WITH AIR PURGE

BACKGROUND AND SUMMARY

The invention relates to oil metering pumps, including those supplying oil to a two-cycle internal combustion engine in metered amounts.

The invention arose during efforts developing an oil metering pump for a marine outboard drive unit having a two-cycle internal combustion engine. In various of such units, it is desirable to provide an automatic oil-fuel mixing system, eliminating the need to manually premix the oil and fuel. The automatic system draws oil from an oil tank and fuel from a fuel tank, and mixes the oil and fuel in a desired ratio. In other applications, it is desirable to provide oil injection.

In a marine outboard drive unit, space is at a premium. It is desirable to locate an oil storage tank on the drive unit, however not at the expense of enlarging the cowl which houses the engine at the top of the. driveshaft housing. In copending application Ser. No. 07/360,273, filed June 2, 1989, entitled "Marine Outboard Drive With Oil Tank", an oil tank is desirably mounted at a location beneath the cowl and around the driveshaft housing. This location makes use of existing space, without interferring with operation of the unit. This also eliminates redesign problems of mounting an oil tank within the cowl, and enlarged cowl dimensions otherwise required thereby. The present invention is particularly useful in combination with the oil tank of the noted copending application.

In the preferred embodiment of the present invention, the oil pump is located within the cowl and above the oil tank. This in turn requires that the oil pump be able to draw oil upwardly from the oil tank. The present oil pump is designed to operate with the oil tank mounted at a location lower than the oil pump so that the oil pump is required to lift the oil to the suction or supply input of the oil pump. However, the pump may also be operated from a position below the tank.

Various metering oil pumps are known in the prior art, however they are not recommended to operate with the oil tank mounted below the oil pump. While such prior pumps are capable of lifting the oil, such orientation is not recommended because of the possibility of air entry. If an air bubble should get into the oil supply input to the pump, the pump will not deliver oil to the engine while the bubble is being purged.

Prior pumps typically have an air bleed screw in the pump body. It is necessary to bleed the air from the line by loosening this screw when the system is being assembled or serviced. Some prior pumps have an air vent which may be returned to the oil tank. The pumps are mounted below the oil tank, so that after assembly, no air enters the pump, and hence there is no chance of an air bubble being delivered to the engine in place of oil.

The present invention provides an oil pump which can be mounted above the oil tank. The oil pump includes a positive air purging stroke which displaces air and removes same from the oil.

The invention is particularly useful in combination with, the oil tank of above noted copending application Ser. No. 07/360,273, filed June 2, 1989, entitled "Marine Outboard Drive With Oil Tank", and with the fill tube of copending application Ser. No. 07/360,272, filed June 2, 1989, entitled "Marine Outboard Drive With Oil Tank Fill Tube", and with the draw tube and indicator assembly of copending application 07/360,272, filed June 2, 1989, entitled "Marine Outboard Drive With Oil Tank Draw Tube and Indicator".

BRIEF DESCRIPTION OF THE DRAWINGS

Prior Art

Present Invention

Figure 7:
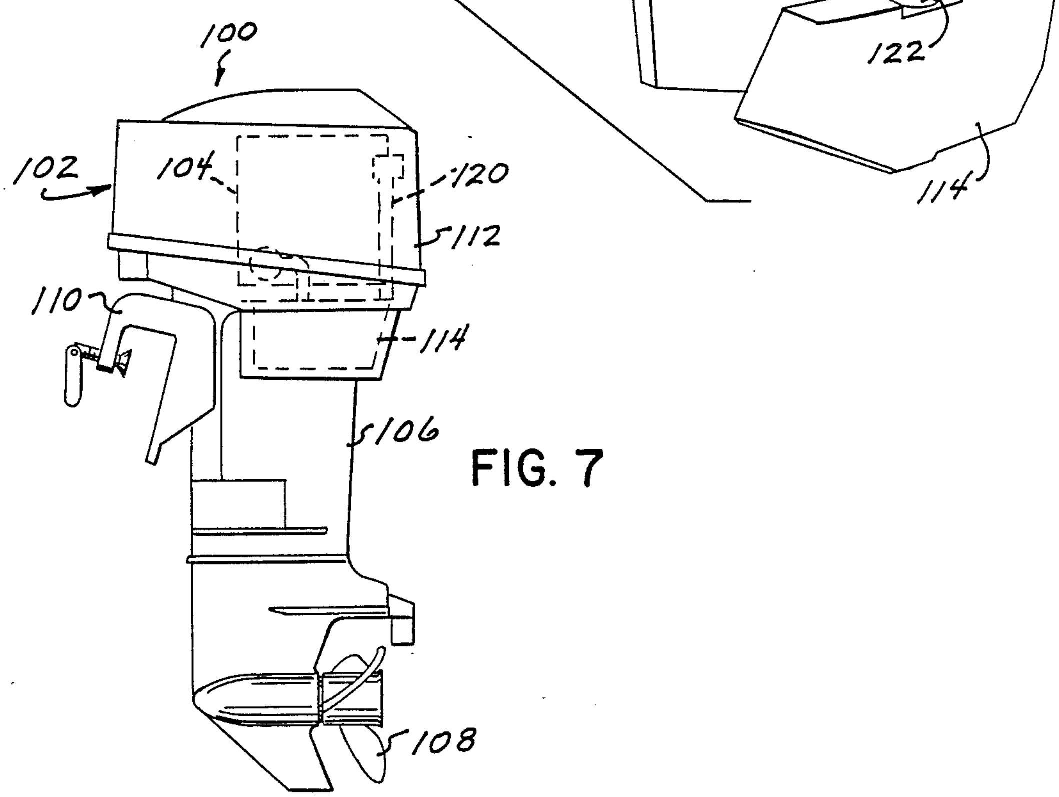

FIG. 7 shows a marine outboard drive unit using an oil metering pump in accordance with the present invention.

Figure 8:
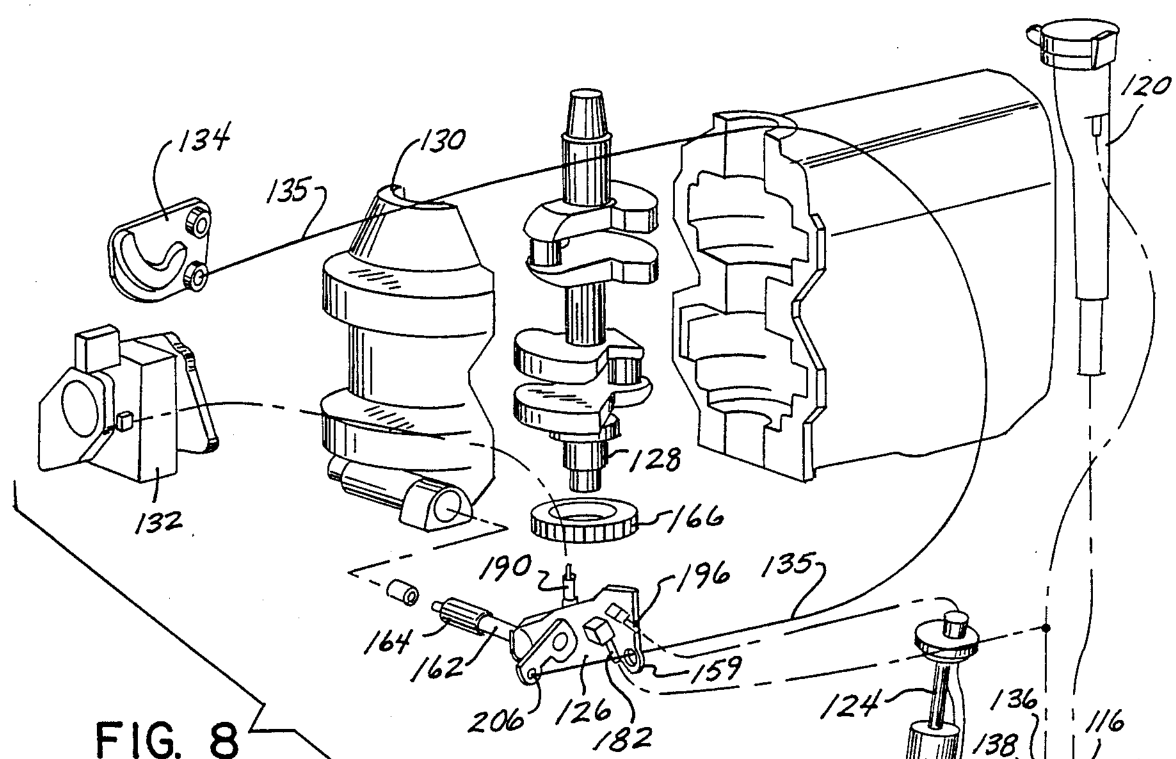

FIG. 8 is an enlarged exploded perspective view of a portion of FIG. 7.

Figure 9:
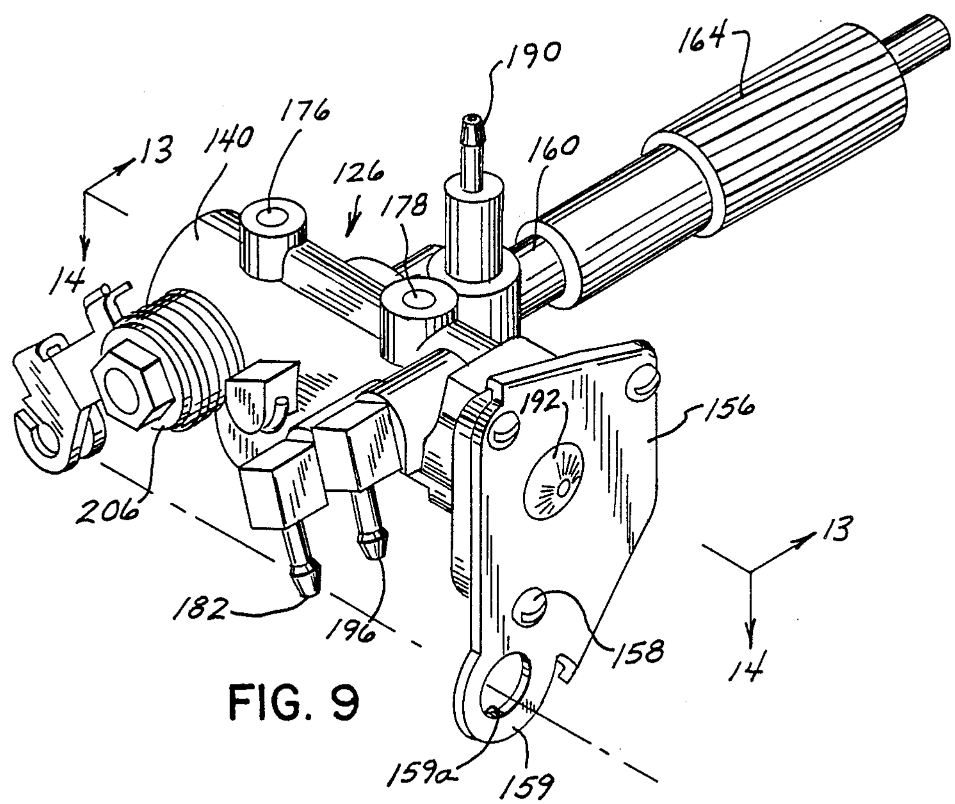

FIG. 9 is a perspective view of an oil metering pump constructed in accordance with the invention.

Figure 10:
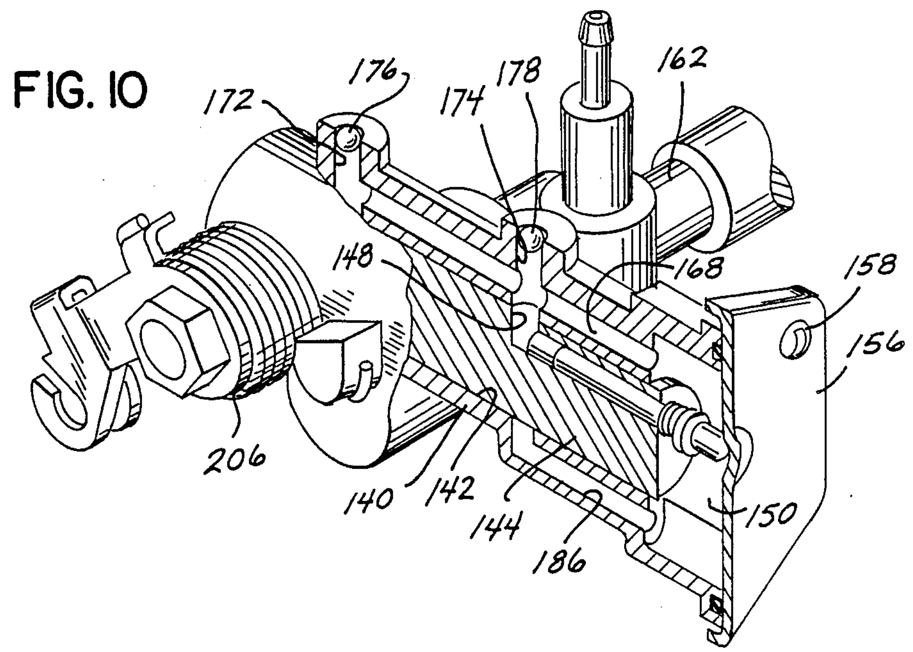

FIG. 10 is a view like FIG. 9 with portions cut away.

Figures 11, 12:
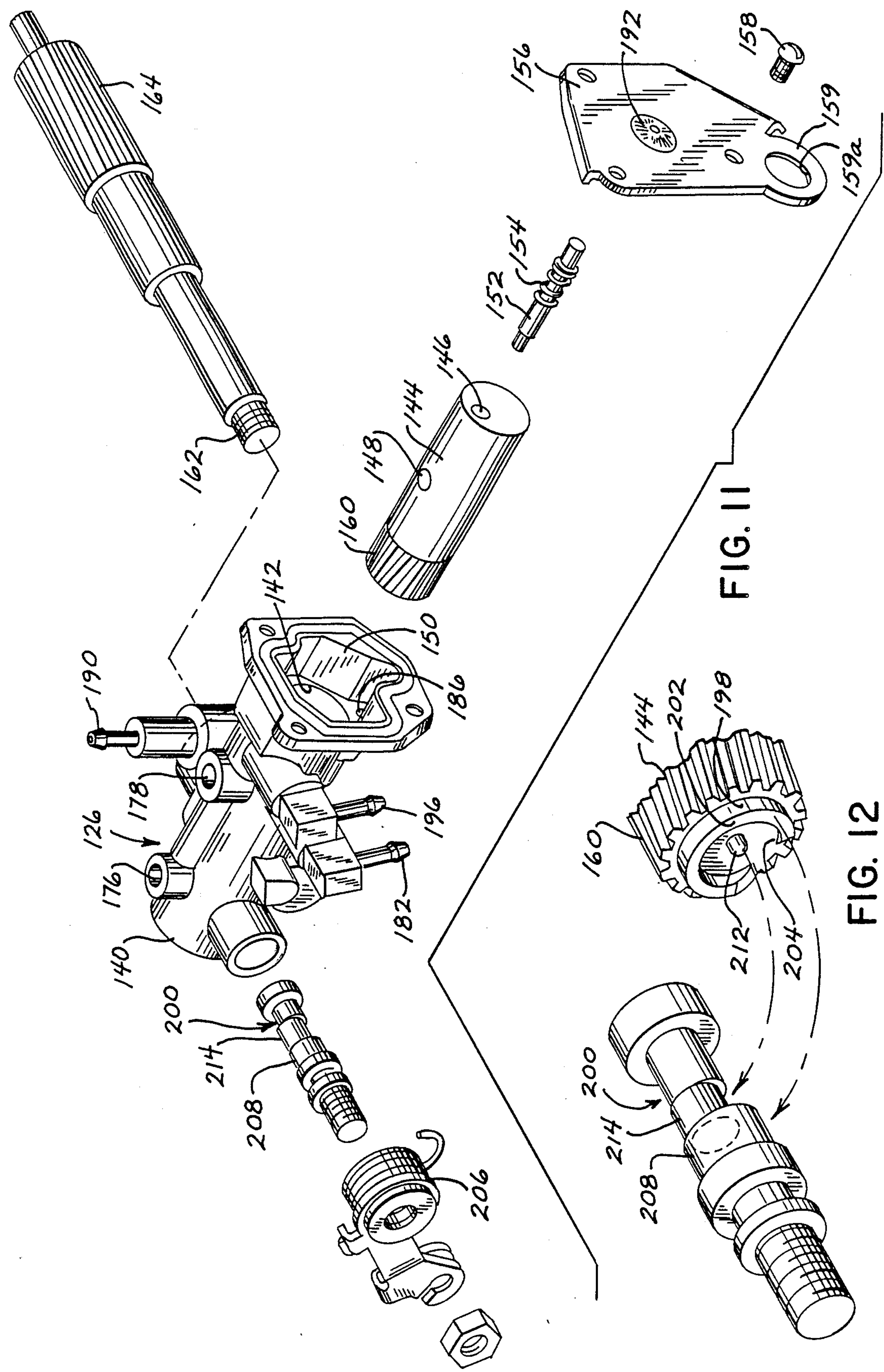

FIG. 11 is an exploded perspective view of the pump of FIG. 9.

FIG. 12 is an enlarged and separated view of some of the components of FIG. 11.

Figure 13:
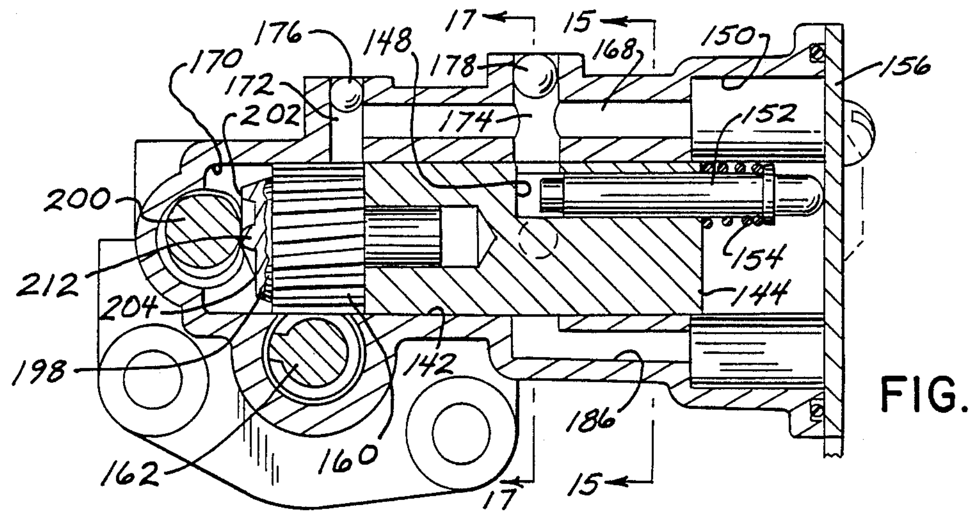

FIG. 13 is a sectional view taken generally along line 13—13 of FIG. 9.

Figure 14:
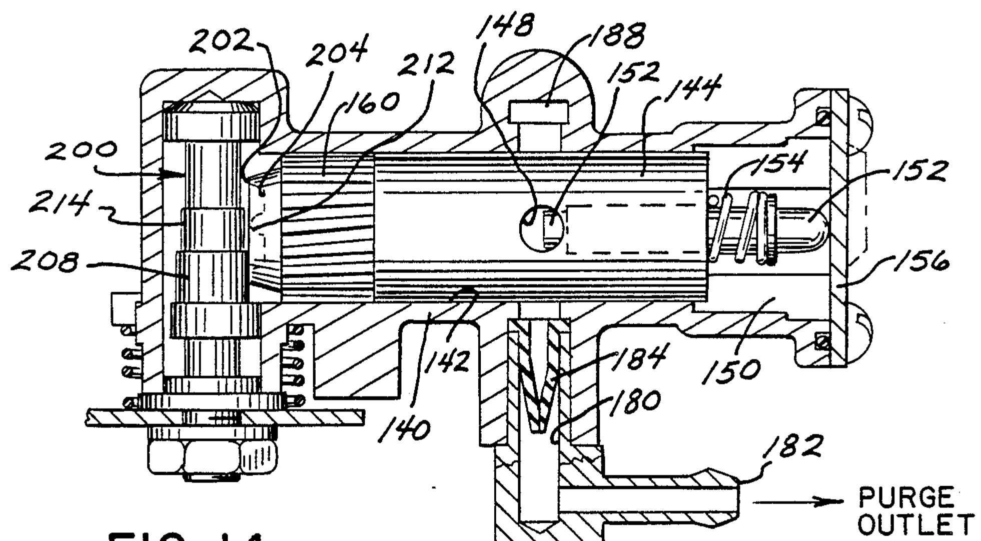

FIG. 14 is a sectional view taken generally along line 14—14 of FIG. 9.

Figure 15:
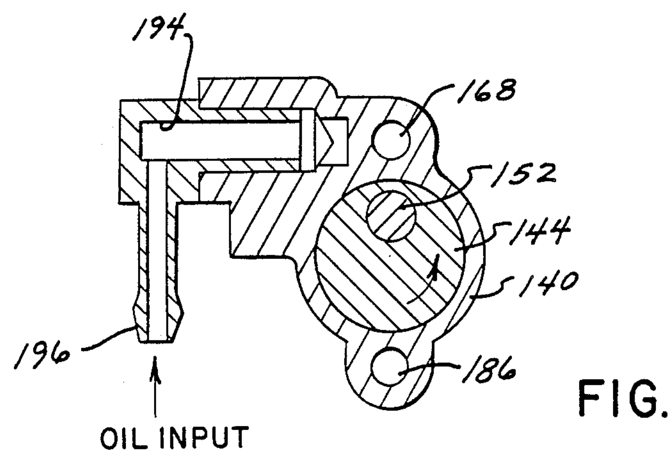

FIG. 15 is a sectional view taken along line 15—15 of FIG. 13.

Figure 16:
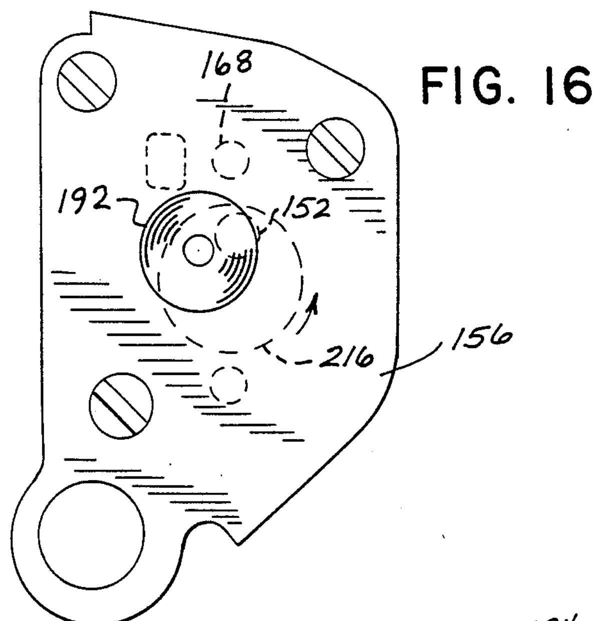

FIG. 16 is an end view of the pump of FIG. 9.

Figure 17:
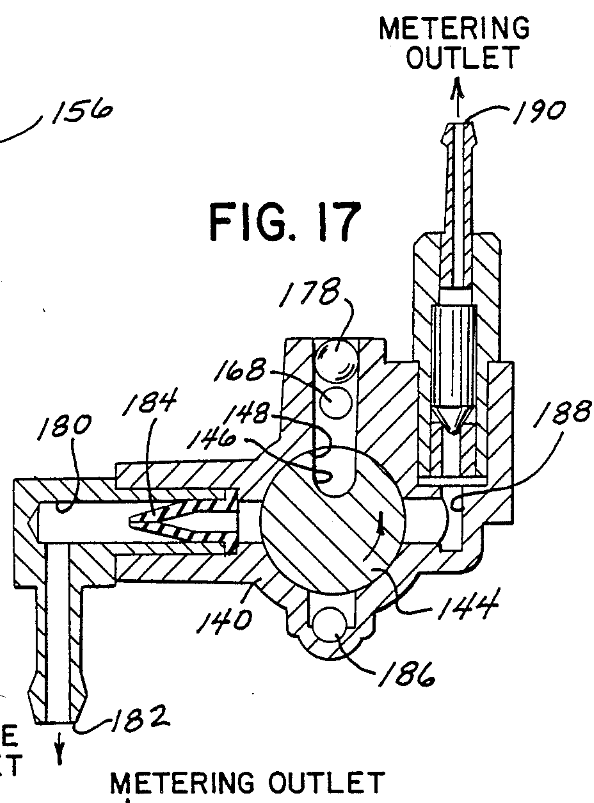

FIG. 17 is a sectional view taken along line 17—17 of FIG. 13.

Figure 18:
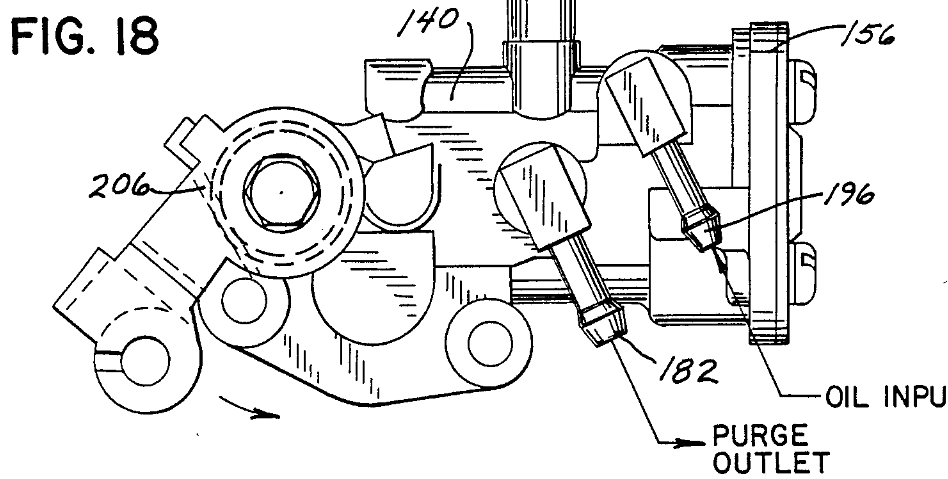

FIG. 18 is a side elevation view of the pump of FIG. 9.

Figure 19:
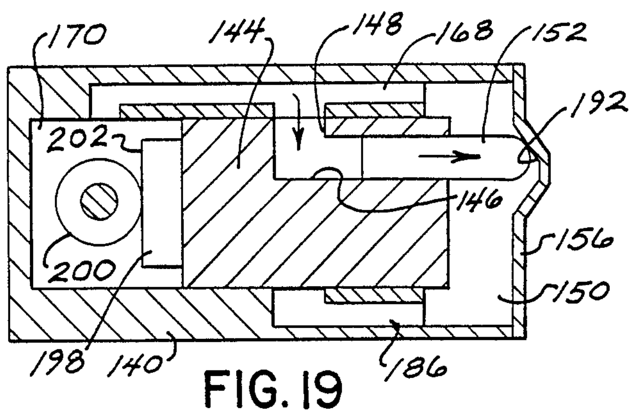

FIG. 19 is a schematic view similar to FIG. 13 and illustrates operation during a first pump stroke.

Figure 20:
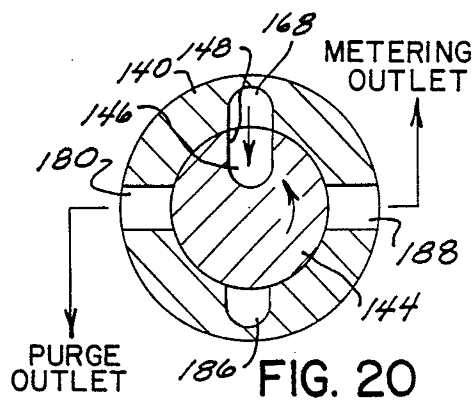

FIG. 20 is a schematic end view of the structure of FIG. 19 showing rotator position during the first stroke.

Figure 21:
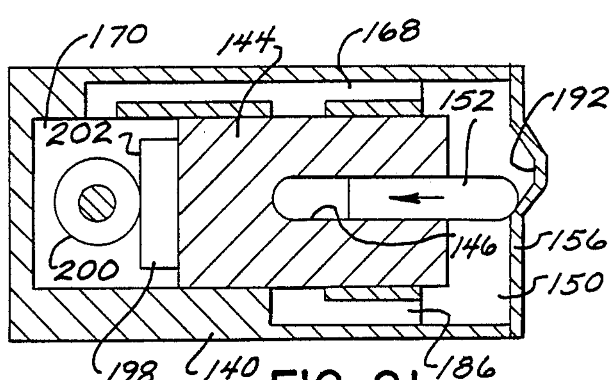

FIG. 21 is similar to FIG. 19 but illustrates a second pump stroke.

Figure 22:
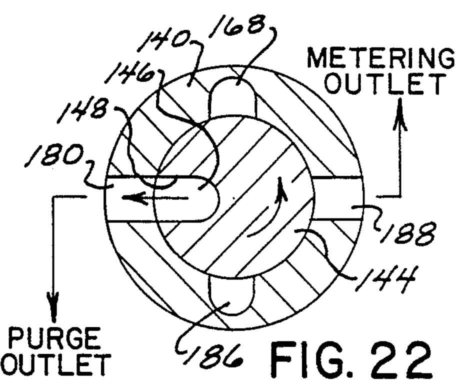

FIG. 22 is similar to FIG. 20 but illustrates a second rotator position corresponding to the second stroke.

Figure 23:
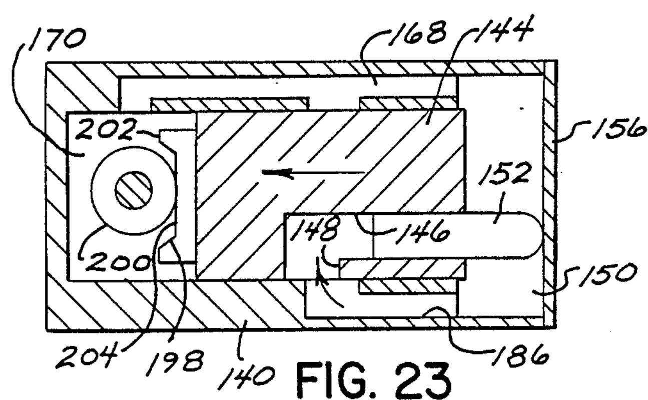

FIG. 23 is similar to FIG. 21 but illustrates a third pump stroke.

Figure 24:
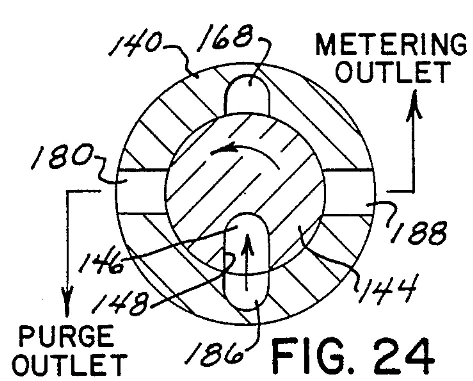

FIG. 24 is similar to FIG. 22 but illustrates a third rotator position corresponding to the third pump stroke.

Figure 25:
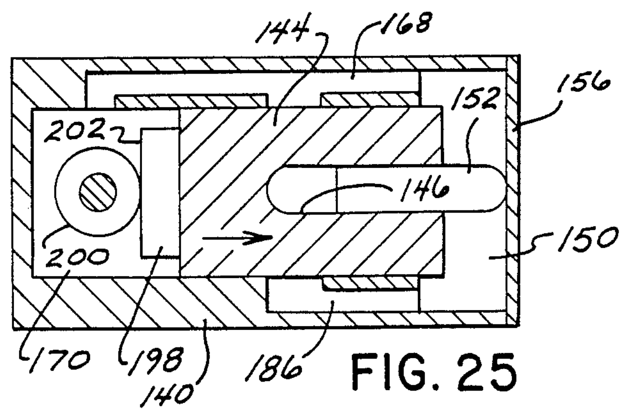

FIG. 25 is similar to FIG. 23 but illustrates a fourth pump stroke.

Figure 26:
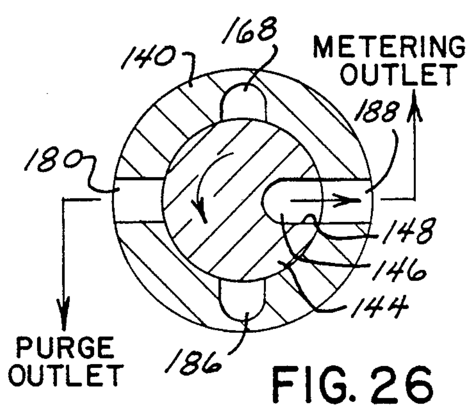

FIG. 26 is similar to FIG. 24 but illustrates a fourth rotator position corresponding to the fourth pump stroke.

Figure 27:
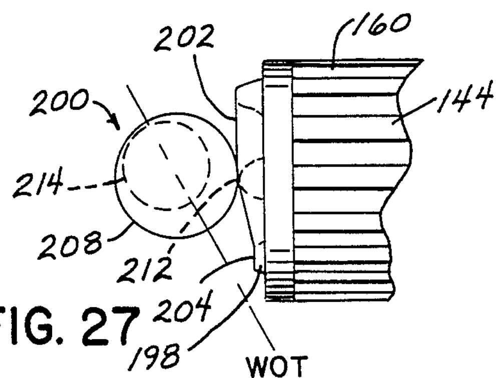

FIG. 27 is a view like a portion of FIG. 13 and illustrates metering cam engagement at wide open throttle.

Figure 28:
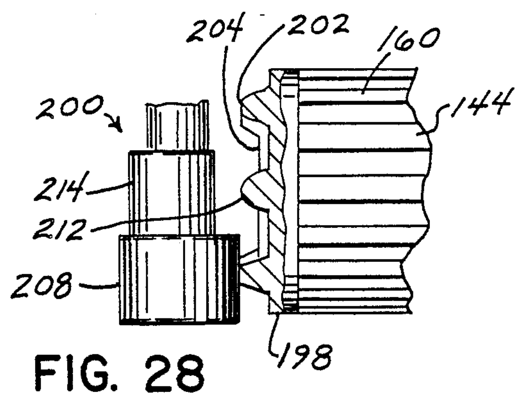

FIG. 28 is a view like a portion of FIG. 14 and shows the engagement of FIG. 27.

Figure 29:
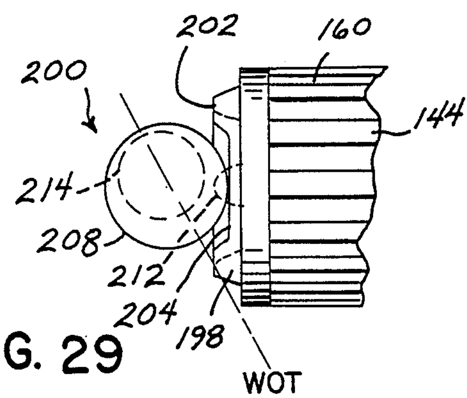

FIG. 29 is like FIG. 27 but shows metering cam engagement during another portion of rotation of the rotator.

Figure 30:
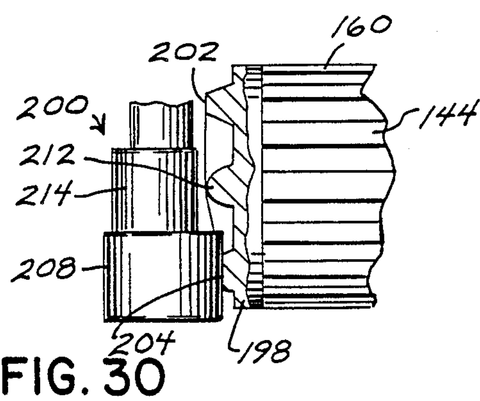

FIG. 30 is like FIG. 28 but shows the engagement of FIG. 29.

Figure 31:
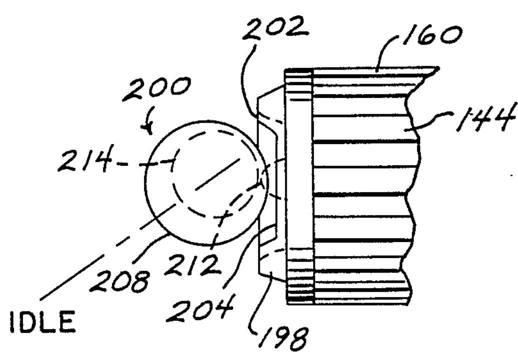

FIG. 31 is like FIG. 27 but shows metering cam engagement at idle.

Figure 32:
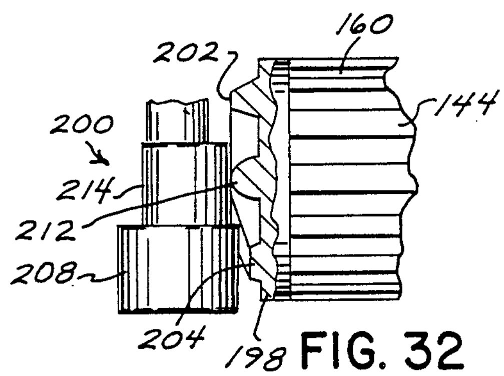

FIG. 32 is like FIG. 28 but shows the engagement of FIG. 31.

Figure 33:
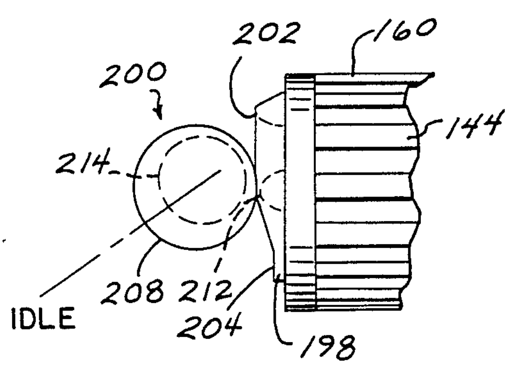

FIG. 33 is like FIG. 31 but shows metering cam engagement during another portion of rotation of the rotator.

Figure 34:
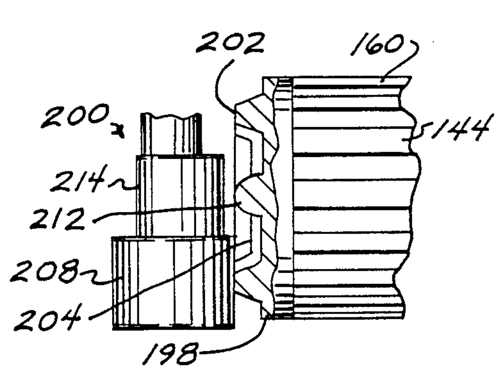

FIG. 34 is like FIG. 32 but shows the engagement of FIG. 33.

FIG. 35 shows the camming profiles of the purge cam and metering cam along a linear plot.

FIG. 36 is an exploded perspective view of an alternate embodiment of a portion of FIG. 11.

FIG. 37 is a view similar to a portion of FIG. 13 but shows the structure of FIG. 36.

DETAILED DESCRIPTION

Prior Art

Figure 1:
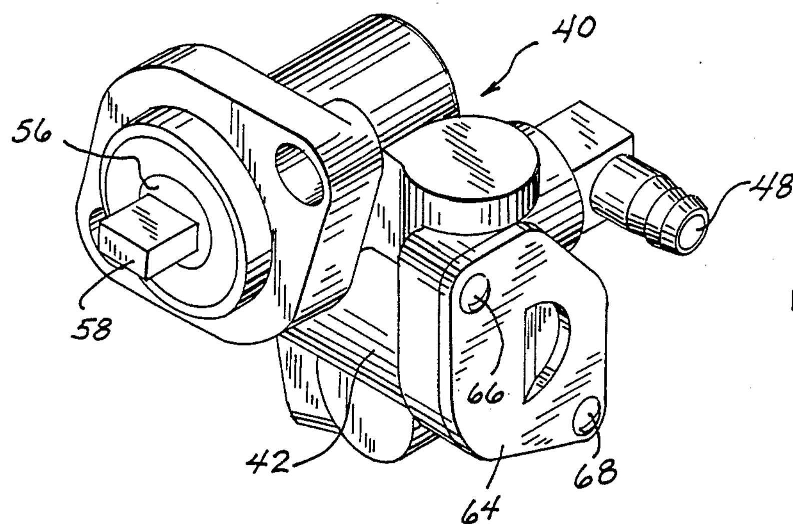
FIG. 1 is a perspective view of an oil metering pump known in the prior art.
Figure 2:
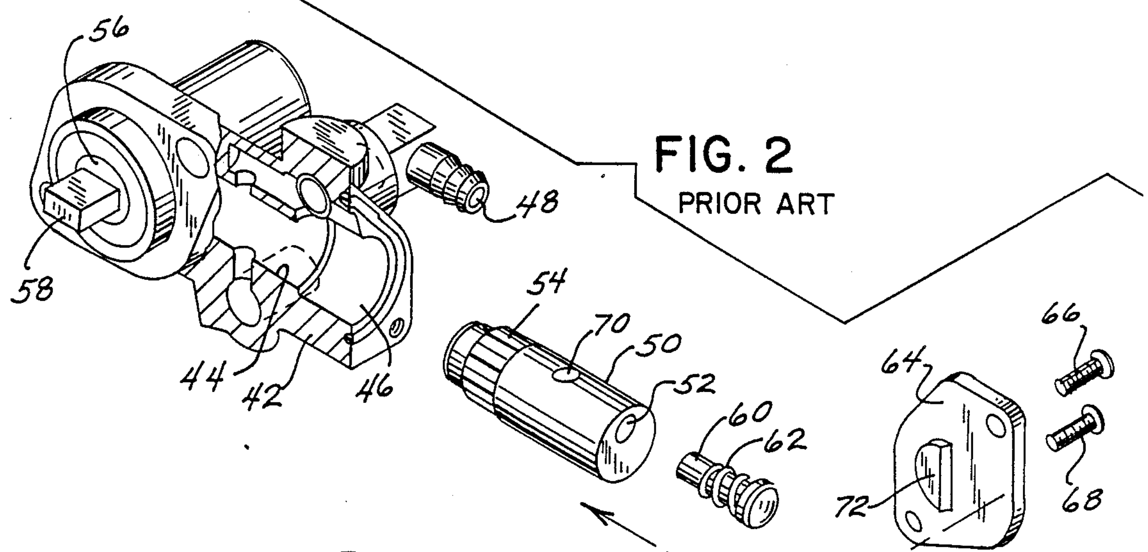
FIG. 2 is an exploded perspective and partially cut away view of the pump of FIG. 1.
Figure 3:
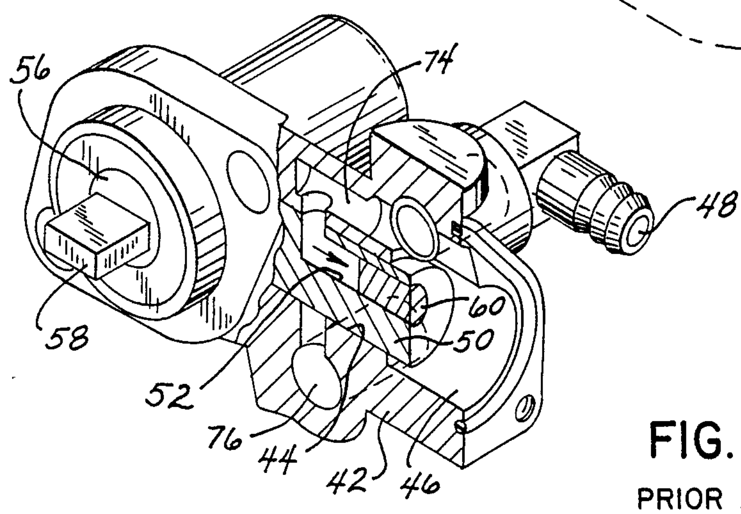
FIG. 3 is a partially cut away view of the pump of FIG. 1.
Figure 4:
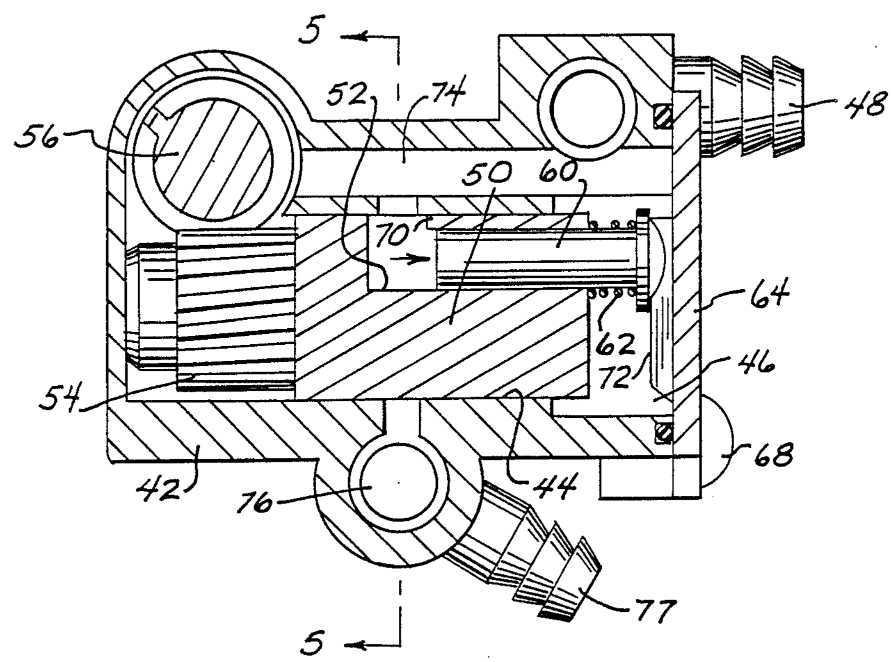
FIG. 4 is a sectional view of the pump of FIG. 1.

FIG. 1 shows a mechanical lubricating oil pump 40 including a pump body 42 having a cylindrical chamber 44, FIG. 2, and a reservoir 46, FIG. 4, with an oil supply input 48 for supplying oil from an oil tank (not shown) to reservoir 46. A cylindrical rotator 50 is in chamber 44 and has a bore 52 extending axially inwardly from the right end, and has gear teeth 54 at the left end engaged by driving worm gear 56 to rotate rotator 50. Worm gear 56 has a tang 58 on its end engaged by a drive connection from the crankshaft of an internal combustion engine to drive same. Piston 60 is axially reciprocal in rotator bore 52 and has an outer right end extending beyond the bore from the right end of the rotator and has an inner left end in bore 52. Piston 60 is biased by spring 62 rightwardly outwardly against end plate 64 which is mounted to pump body 42 by screws 66 and 68. Rotator 50 has a radial opening 70 in the cylindrical sidewall thereof communicating with bore 52. End plate 64 has a cam surface 72 formed thereon which cams piston 60 into and out of bore 52 as rotator 50 rotates. The axial travel strokes of piston 60 transfer oil into and out of bore 52 through opening 70, and provide pumping action.

Figure 5:
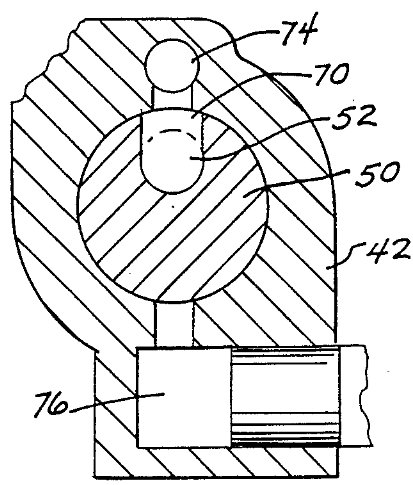
FIG. 5 is a sectional view taken along line 5—5 of FIG. 4.
Figure 6:
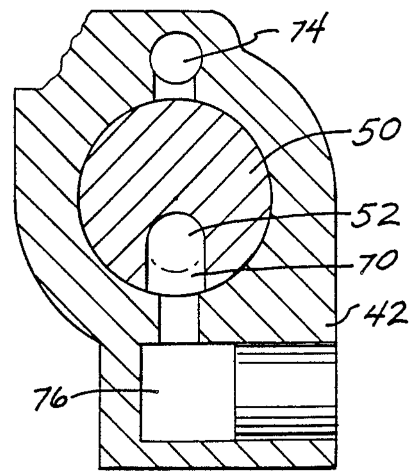
FIG. 6 is a view like FIG. 5, but shows the rotator in a different position.

In operation, at a first position of rotator 50, FIG. 5, opening 70 is aligned with upper transfer passage 74 from reservoir 46. Piston 60 is extended rightwardly to expand bore 52 and transfer oil from reservoir 46 through passage 74 and opening 70 into bore 52. Upon 180° counterclockwise rotation of rotator 50 to the position shown in FIG. 6, opening 70 is now in alignment with the lower passage 76 leading to metered oil output 77 supplying oil to the engine. Plunger 60 is cammed back inwardly leftwardly into bore 52 by cam 72 to contract bore 52 and push the oil therein out through opening 70 into passage 76. Upon another 180° of rotation, rotator 50 returns to the position shown in FIG. 5 to begin the next cycle.

Various alternatives are known in the art, including multiple pistons, each being cammed during a cycle of revolution of the rotator and providing multiple metered oil outputs, for example for increased capacity for multiple cylinder engines. Various structures are also known for adjusting the length of the travel stroke. For further background, reference is made to U.S. Pat. Nos. 4,034,830, 4,036,326, 4,043,711, 4,231,716 and 4,797,073, all incorporated herein by reference, and to Mercury Marine, Brunswick Corp., Outboard Service Training Notebook 90-90592, page 109, 1986.

Present Invention

FIG. 7 shows a marine outboard drive unit 100 having a powerhead 102 including a two-cycle internal combustion engine 104 and having a lower depending driveshaft housing 106 extending downwardly from the powerhead and having a lower submerged propeller 108. The unit is mounted to the transom of a boat by transom bracket 110. Cowl 112 encloses engine 104. Mounted below the cowl and partially around driveshaft housing 106 is a U-shaped oil tank 114, FIG. 8, which is the subject of the above noted copending application Ser. No. 07/360,273, filed June 2, 1989, entitled "Marine Outboard Drive With Oil Tank". Oil tank 114 has a first aperture 116 in the top thereof with an upstanding fitting 118 for filling the tank with oil, for example from a fill tube 120 within cowl 112. Fill tube 120 is the subject of above noted copending application Ser. No. 07/360,272, filed June 2, 1989, entitled "Marine Outboard Drive With Oil Tank Fill Tube". Tank 114 has a second aperture 122 in the top thereof for receiving a draw tube and indicator assembly 124 for drawing oil from the tank and for indicating the level of oil in the tank. Assembly 124 is the subject of above noted copending application Ser. No. 07/360,274, filed June 2, 1989, entitled "Marine Outboard Drive With Oil Tank Draw Tube and Indicator". The oil is drawn by oil pump 126, which is the subject of the present invention. Oil pump 126 is above tank 114. Oil pump 126 has a gear 164 driven by gear 166 on engine crankshaft 128 in crankcase 130 and pumps oil to carburetor 132 as controlled by throttle 134 through control cable 135. Tank 114 has a third aperture 136 with an upstanding fitting 138 providing a vent for the tank and receiving purged oil and air from pump 126, to be described.

Pump 126, FIG. 9, includes a pump body 140 having a cylindrical chamber 142, FIGS. 10, 11. A cylindrical rotator 144 is in chamber 142. Rotator 144 has a bore 146 extending axially thereinto, and has a radial opening 148 in its cylindrical sidewall communicating with bore 146. Pump body 140 has a reservoir 150 at the end of cylindrical chamber 142. Piston 152 is axially reciprocal in bore 146 in rotator 144 and is biased rightwardly outwardly therefrom by spring 154 such that the outer end of piston 152 extends beyond the right end of rotator 144 and is biased into engagement with right end wall 156. End wall 156 is mounted to pump body 140 by screws such as 158. End wall 156 includes a tab or tang 159 with an aperture 159a for mounting control cable 135 therethrough. The inner or left end of piston 152 is within bore 146. The left end of rotator 144 has gear teeth 160 engaged by driving worm gear 162 which in turn is driven at teeth 164 by gear ring 166, FIG. 8, on crankshaft 128. Worm gear 162 rotates rotator 144 in pump body 140.

Pump body 140 has an upper oil and air purge input passage 168 communicating between the top of reservoir 150 and radial opening 148 of rotator 144 when the latter is in a first position, FIGS. 10, 11, 13, 17, 19 and 20. Passage 168 also communicates leftwardly with a reservoir 170 in the pump body at the left end of rotator 144. Drill passages 172 and 174 communicating with passage 168 are permanently sealed closed by balls 176 and 178, FIGS. 10 and 13. The noted first position of the rotator during its revolution is the 90° position of the rotator as schematically shown in FIG. 20. In this first position, radial opening 148 is in an upward position, as shown in FIGS. 10, 13, 17, 19 and 20. This first position of the rotator also corresponds to a first stroke of piston 152 expanding bore 146 as illustrated in FIG. 19.

Pump body 140 has an oil and air purge output passage 180, FIGS. 14 and 17, communicating between a purge outlet 182 and radial opening 148 of rotator 144 when the latter is in a second rotated position, as illustrated in FIG. 22 at the 180° position. At this position, piston 152 is in a second stroke being cammed inwardly to contract bore 146. Passage 180 includes duckbill valve 184.

Pump body 140 has an oil metering input passage 186, FIGS. 10 and 13, communicating between the bottom of reservoir 150 and opening 148 in rotator 144 when the latter is in a third rotated position as illustrated in FIG. 24 at the 270° position. At this position, rotator 144 is being cammed to move leftwardly, FIG. 23, to expand bore 146.

Pump body 140 has an oil metering output passage 188, FIG. 17, communicating between metering outlet 190 and opening 148 in rotator 144 when the latter is in a fourth rotated position as shown in FIG. 26 at the 0° position. At this position, rotator 144 is cammed rightwardly as illustrated in FIG. 25 to contract bore 146.

In operation, during the first stroke, FIGS. 19 and 20, piston 152 moves rightwardly axially out of bore 146 due to spring 154 urging the right outer end of piston 152 against camming surface 192 on end plate 156. This expands bore 146 at the noted first position during the noted first stroke. During this stroke, oil, and air if present, is transferred from the top of reservoir 150 through passage 168 and through aligned opening 148 into bore 146, FIG. 19.

Upon further 90° of counterclockwise rotation of rotator 144, the latter is in the position shown in FIGS. 21 and 22. Piston 152 is cammed by camming surface 192 on end plate 156 to move leftwardly axially inwardly into bore 146 to contract the latter and discharge the oil and any air therein to passage 180 and purge outlet 182, FIGS. 22, 17, 14, which is connected to tank 114 at fitting 138, FIG. 8. Air if present is thus returned to tank 114 as positively pumped by contraction of bore 146 due to the inward axial movement of piston 152. During the axial inward movement of piston 152, a vacuum is created in reservoir 150 which draws oil into the reservoir through passage 168 and passage 194, FIG. 15, communicating with passage 168 and connected to oil supply input 196 which is connected to oil tank 114 at draw tube assembly 124, FIG. 8.

Upon further 90° of rotation of rotator 144, the latter rotates to the position shown in FIGS. 23 and 24. At this third position, a third pump stroke is effected by leftward axial movement of rotator 144 which expands bore 146. The leftward stroke is effected by a camming surface 198 on the left end of rotator 144 which is engaged by a left cam 200. In FIGS. 19 and 21, cam 200 is on a high lobe portion 202 of cam surface 198. In FIG. 23, cam 200 is in engagement with a low lobe portion 204 of cam surface 198. Cam surface 198, including high and low lobe portions 202 and 204, forms an annulus concentric to the axis of rotation of rotator 144. Engagement of left cam 200 with low lobe portion 204 enables rotator 144 to move axially leftwardly as shown in FIG. 23, due to the bias of spring 154, FIG. 11. Leftward axial movement of rotator 144 causes relative axial movement between rotator 144 and piston 152 which expands bore 146 and provides the noted third stroke. During this stroke, oil is transferred from the bottom of reservoir 150 through passage 186 and aligned opening 148 into bore 146.

Upon further 90° of rotation of rotator 144, the latter rotates to the position shown in FIGS. 25 and 26. Cam surface 198 on the left end of rotator 144 is now rotated to a position such that high lobe portion 202 engages left cam 200 to thus cam rotator 144 axially rightwardly as shown in FIG. 25 to contract bore 146 and force the oil therein to be expelled through passage 188, FIGS. 26 and 17, to metering outlet 190 which is connected to carburetor 132, FIG. 8, or to an oil injection system, or the like. During this rightward axial stroke of rotator 144, a vacuum is created in left reservoir portion 170 which draws oil into the reservoir through passages 168 and 194 from oil supply input 196 and tank 114.

Upon further 90° of rotation of rotator 144, the latter returns to the position shown in FIGS. 19 and 20, to begin the next cycle.

Cams 192 and 200 cam piston 152 and rotator 144, respectively, to cause relative movement therebetween along a plurality of axial travel strokes. It is preferred that the first two travel strokes, FIGS. 19 and 21, be provided by camming the piston 152, and that the third and fourth travel strokes, FIGS. 23 and 25, be provided by camming the rotator 144. In other embodiments, these roles may be reversed. Further alternatively, all four strokes may be provided by camming the piston, or all four strokes may be provided by camming the rotator. All four strokes occur during each revolution of the rotator.

The noted first and second strokes are longer than the noted third and fourth strokes to provide differential expansion and contraction of bore 146 during each revolution of rotator 144. The first two strokes provide oil and air purging. The third and fourth strokes provide oil metering. FIG. 35 illustrates the differential stroking provided by the differing cam heights of purge cam 192 and metering cam 198. A greater amount of fluid is transferred from oil and air purge input passage 168 to oil and air purge output passage 180 than is transferred from oil metering input passage 186 to oil metering output passage 188.

Transfer passage 168 is at the top of reservoirs 150 and 170 and provides the oil and air purge passage. Transfer passage 186 is at the bottom of reservoir 150 and provides the oil metering input passage. Oil and air purge output passage 180 and oil metering output passage 188 are on opposite sides of rotator 144 and between oil and air purge input passage 168 and oil metering input passage 186. Oil metering output passage 188 exits pump body 140 without communicating with reservoirs 150 or 170.

In the preferred embodiment, oil and air purge output passage 180 communicates with tank 114 and exits pump body 140 without communicating with reservoirs 150 or 170, and transfers fluid directly from rotator bore 146 to tank 114 during the noted second stroke. In an alternative embodiment, drill passage 174 is used as the oil inlet, and oil and air purge output passage 180 communicates across the bottom of the pump with the reservoirs 150 and 170 and transfers fluid from rotator bore 146 to the reservoirs during the second stroke. Due to the noted differential stroking, this latter embodiment will quickly pump more purged oil and air than metered oil, and hence cause the reservoirs to quickly fill and overflow back to the tank via a return passage or line exiting from the top of the reservoir 150, thus forcing air and excess oil back to the tank.

The pump thus has a plurality of strokes during each revolution of the rotator, including: an oil and air purge input stroke expanding the internal bore in the rotator and transferring oil, and air if present, from the top of the reservoir in the pump body; a second oil and air purge output stroke contracting the bore and expelling oil, and air if present; a third oil metering input stroke expanding the bore and transferring oil from the bottom of the reservoir to the bore; and a fourth metering oil output stroke contracting the bore and outputing metered oil to the engine.

Metering cam 200 is connected at linkage 206, FIGS. 8 and 11, to control cable 135 for adjusting cam 200 to adjust the noted third and fourth metering strokes to adjust the metered oil output of the pump. Metering cam 200 is thus responsive through linkage 206 and control cable 135 to external input at throttle 134. Cam 200 is a spindle mounted to rotate in pump body 140 about an axis perpendicular to the rotational axis of rotator 144. Cam 200 has an eccentric camming surface 208, FIGS. 11, 12, 14, 27 and 28, engagable with camming surface 198 at the left end of rotator 144 to effect the noted third and fourth strokes. Rotation of cam 200 causes shortening and lengthening of the third and fourth strokes to adjust the metered oil output.

The left end of rotator 144 includes a stop button or surface 212, FIG. 12, laterally radially spaced inwardly from camming surface 198 including high and low lobe portions 202 and 204. Metering cam 200 includes a stop surface 214 aligned along the rotational axis of rotator 144 with stop button 212. Cam 200 is rotatable to a full stroking wide open throttle position, FIGS. 27–30, wherein eccentric camming surface 208 of cam 200 engages camming surface 198 at the left end of rotator 144 at all times, at either the high lobe portion 202, FIGS. 27 and 28, or the low lobe portion 204, FIGS. 29 and 30. Cam 200 is rotatable to a minimum stroking position at engine idle wherein stop surface 214 engages stop button 212 during a portion of rotation of rotator 144, FIGS. 31 and 32, to prevent engagement of camming surface 208 with low lobe portion 204, and eccentric camming surface 208 engages high lobe portion 202 during the remaining portion of rotation of rotator 144, FIGS. 33 and 34. The noted stopping action of stop button 212 against stop surface 214, FIGS. 31 and 32, shortens the length of the third and fourth strokes. The adjustment of the length of the metering third and fourth strokes adjusts the amount of oil metered by the pump to engine 104, to provide a greater amount of oil at wide open throttle, FIGS. 27–30, and a lesser amount of oil at idle, FIGS. 31–34.

The height difference between the high lobe and low lobe portions 202 and 204 of camming surface 198 at the left end of rotator 144 is smaller than the camming stroke length of piston 152 effected by purge cam 192, FIG. 35. The camming stroke length of travel between engagement of high lobe portion 202 of camming surface 198 with eccentric camming surface 208 of cam 200 and the engagement of stop button 212 with stop surface 214 is shorter than the height difference between high and low lobe portions 202 and 204.

In a further embodiment, it has been found that in cold conditions and/or at high speeds, it may be desirable to additionally include the structure shown in FIGS. 36 and 37. In cold conditions, the oil is thick, and there is increased resistance to oil flow through the various passages. Furthermore, at high speeds, the rotator may not follow the desired camming action. Initially, a heavier spring 154 was used with a higher rating. However, this caused a groove or track to be worn into end plate 156, as shown in dashed line at 216 in FIG. 16. To solve this problem and still afford increased spring pressure, a second spring 218, FIG. 36, is added which puts more force on rotator 144 without increasing the force on piston 152.

Second spring 218 biases rotator 144 in an axial direction aiding the bias of first spring 154. Springs 154 and 218 extend axially from the right end of rotator 144 and parallel to each other, and are spaced radially outwardly from the axis of rotation of rotator 144. A retainer disc 220 at end wall 156 has a first opening 222 receiving the outer rightward end of plunger 152 and guiding same. Disc 220 has an axially extending boss 224 receiving and guiding spring 218 therearound. A spindle 226 extends from the right end of rotator 144 axially toward and into opening 228 in boss 224 and is guided therein. Spring 218 circumferentially surrounds spindle 226. Boss 224 is an annular portion of retainer disc 220 and extends axially between spring 218 and spindle 226.

It is recognized that various equivalents, alternatives and modifications are possible within the scope of the appended claims.

I claim:

1. A mechanical lubricating oil pump disposed above an oil tank and drawing oil therefrom, comprising a pump body having a cylindrical chamber, a cylindrical rotator in said chamber, said rotator having a bore therein, a gear driving said rotator to rotate same, a piston axially reciprocal in said bore in said rotator, cam means camming at least one of said piston and said rotator to cause relative movement therebetween along a plurality of axial travel strokes changing the volume of said bore during each revolution of said rotator, including a stroke purging air drawn from said tank.

2. The invention according to claim 1 wherein said pump body includes a reservoir, and wherein said plurality of travel strokes comprise a first stroke expanding said bore and transferring oil and air if present, from the top of said reservoir to said bore, a second stroke contracting said bore and expelling oil, and air if present, and also drawing oil upwardly from said tank to said reservoir, a third stroke expanding said bore and transferring oil from the bottom of said reservoir to said bore, and a fourth stroke contracting said bore and discharging oil and also drawing oil upwardly from said tank to said reservoir, said air purging stroke being said second stroke.

3. The invention according to claim 2 wherein said piston has an outer end extending beyond said bore from one end of said rotator, said piston has an inner end in said bore, said rotator has a radial opening in a cylindrical sidewall thereof communicating with said bore, said pump body has an oil supply input connected to said tank for supplying oil to said reservoir, said pump body has a purge outlet, said pump body has a metered oil outlet, said pump body has a first passage communicating between the top of said reservoir and said radial opening in said rotator during said first stroke at a first position of said rotator during its revolution, said pump body has a second passage communicating between said purge outlet and said radial opening in said rotator during said second stroke at a second position of said rotator during its revolution, said pump body has a third passage communicating between the bottom of said reservoir and said radial opening in said rotator during said third stroke at a third position of said rotator during its revolution, said pump body has a fourth passage communicating between said metered oil outlet and said radial opening in said rotator during said fourth stroke at a fourth position of said rotator during its revolution.

4. The invention according to claim 3 wherein said second and fourth positions of said rotator are on opposite sides of said pump body between said first and third positions of said rotator.

5. The invention according to claim 4 wherein said second stroke contracting said bore moves said piston inwardly into said bore and creates a vacuum in said reservoir to draw oil upwardly from said tank through said oil supply input into said reservoir, and wherein said fourth stroke contracting said bore moves said piston inwardly into said bore and creates a vacuum in said reservoir to draw oil from said tank through said oil supply input into said reservoir, such that oil is drawn from said tank during each of said second and fourth strokes, said second stroke additionally purging air from said bore, said fourth stroke additionally supplying oil to said metered oil outlet.

6. The invention according to claim 5 wherein said piston is cammed during one of said second and fourth strokes, and said rotator is cammed during the other of said second and fourth strokes.

7. The invention according to claim 6 wherein said pump body includes a reservoir with reservoir chambers at each end of said rotator communicating through an upper passage, said upper passage communicating with said radial opening in said rotator during said first stroke at said first position of said rotator during its revolution, such that a vacuum is created in said reservoir during said second stroke during movement of said piston in a first axial direction, to draw oil from said oil supply input, and such that a vacuum is created in said reservoir during said fourth stroke during movement of said rotator in an opposite axial direction, to draw oil from said oil supply input.

8. A mechanical lubricating oil pump comprising a pump body having a cylindrical chamber, a cylindrical rotator in said chamber, said rotator having a bore therein, a gear driving said rotator to rotate same, a piston axially reciprocal in said bore in said rotator, cam means camming at least one of said piston and said rotator to cause relative movement therebetween along a plurality of axial travel strokes changing the volume of said bore during each revolution of said rotator, comprising four strokes per revolution of said rotator.

9. The invention according to claim 8 wherein said cam means comprises a first cam effecting two strokes of said piston per revolution of said rotator, and a second cam effecting two strokes of said rotator per revolution of said rotator.

10. The invention according to claim 9 wherein said strokes of said piston are longer than said strokes of said rotator.

11. The invention according to claim 10 comprising means adjustably changing the length of the travel stroke of said rotator.

12. The invention according to claim 8 wherein said strokes comprise a first stroke expanding said bore, a second stroke contracting said bore, a third stroke expanding said bore, and a fourth stroke contracting said bore, all four strokes occuring during each revolution of said rotator, and comprising means adjustably changing the length of two of said strokes relative to the other two of said strokes.

13. The invention according to claim 12 wherein said last mentioned means adjustably changes the length of said third and fourth strokes, and wherein the length of said first and second strokes is longer than the length of said third and fourth strokes during the entire range of adjustment of the length of said third and fourth strokes.

14. A mechanical lubricating oil pump comprising a pump body having a cylindrical chamber, a cylindrical rotator in said chamber, said rotator having a bore therein, a gear driving said rotator to rotate same, a piston axially reciprocal in said bore in said rotator, cam means camming at least one of said piston and said rotator to cause relative movement therebetween along a plurality of axial travel strokes of different length differentially changing the volume of said bore during each revolution of said rotator, comprising a first stroke expanding said bore, a second stroke contracting said bore, a third stroke expanding said bore, and a fourth stroke contracting said bore, all four strokes occuring during each revolution of said rotator, said first and second strokes being longer than said third and fourth strokes to provide differential expansion and contraction of said bore during each revolution of said rotator.

15. The invention according to claim 14 wherein said piston has an outer end extending beyond said bore from one end of said rotator and has an inner end in said bore, said rotator has a radial opening in a cylindrical sidewall thereof communicating with said bore, said pump body has an oil and air purge input passage communicating with said radial opening in said rotator during said first stroke, said pump body has an oil and air purge output passage communicating with said radial opening in said rotator during said second stroke, said pump body has an oil metering input passage communicating with said radial opening in said rotator during said third stroke, said pump body has an oil metering output passage communicating with said radial opening in said rotator during said fourth stroke, and wherein a greater amount of fluid is transferred from said oil and air purge input passage to said oil and air purge output passage than is transferred from said oil metering input passage to said oil metering output passage.

16. The invention according to claim 15 wherein said pump body has a reservoir and a plurality of transfer passages communicating between said reservoir and said radial opening in said rotator at respective positions of said rotator during its revolution, one said transfer passage being generally at the top of said reservoir and providing said oil and air purge input passage, another said transfer passage being generally at the bottom of said reservoir and providing said oil metering input passage.

17. The invention according to claim 16 wherein said oil and air purge outlet passage and said oil metering output passage are on opposite sides of said rotator and between said oil and air purge input passage and said oil metering input passage.

18. The invention according to claim 17 wherein said pump body includes an oil supply input for supplying oil from an oil tank to said reservoir and said oil and air purge input passage, and wherein said oil metering output passage exits said pump body without communicating with said reservoir.

19. The invention according to claim 18 wherein said oil and air purge output passage communicates with said tank.

20. The invention according to claim 19 wherein said oil and air purge outlet passage exits said pump body without communicating with said reservoir and transfers fluid directly from said rotator bore to said tank during said second stroke.

21. The invention according to claim 18 wherein said reservoir includes a first reservoir chamber at one end of said rotator and a second reservoir chamber at the other end of said rotator, said first and second reservoir chambers communicating through said one transfer passage.

22. The invention according to claim 18 wherein said oil and air purge output passage communicates with said reservoir and transfers fluid from said rotator bore to said reservoir during said second stroke.

23. A mechanical lubricating oil pump comprising a pump body having a cylindrical chamber and a reservoir with an oil supply input for supplying oil from an oil tank to said reservoir, a cylindrical rotator in said chamber, said rotator having a bore therein, a gear driving said rotator to rotate same, a piston axially reciprocal in said bore in said rotator and having an outer end extending beyond said bore from one end of said rotator and having an inner end in said bore, said rotator having a radial opening in a cylindrical sidewall thereof communicating with said bore, said pump body having a first passage communicating between the top of said reservoir and said radial opening in said rotator at a first position of said rotator during its revolution, said pump body having a second passage communicating between a purge outlet and said radial opening in said rotator at a second position of said rotator during its revolution, said pump body having a third passage communicating between the bottom of said reservoir and said radial opening in said rotator at a third position of said rotator during its revolution, said pump body having a fourth passage communicating between an oil outlet and said radial opening in said rotator at a fourth position of said rotator during its revolution, cam means camming at least one of said piston and said rotator to cause relative movement therebetween along a plurality of axial travel strokes changing the volume of said bore during each revolution of said rotator, comprising a first stroke expanding said bore at said first position and transferring oil, and air if present, from the top of said reservoir through said first passage to said bore, a second stroke at said second position contracting said bore and transferring oil, and air if present, from said bore through said second passage to said purge outlet, a third stroke at said third position expanding said bore and transferring oil from the bottom of said reservoir through said third passage to said bore, and a fourth stroke at said fourth position contracting said bore transferring oil from said bore through said fourth passage to said oil outlet.

24. The invention according to claim 23 wherein said first position of said rotator is at the top of said pump body, said third position is at the bottom of said pump body, and said second and fourth positions are on opposite sides of said pump body and between said first and third positions.

25. The invention according to claim 23 wherein said travel strokes have different lengths differentially changing the volume of said bore during each revolution of said rotator.

26. The invention according to claim 25 wherein said first and second strokes are longer than said third and fourth strokes.

27. The invention according to claim 26 wherein said purge outlet is connected to said oil tank, such that said second stroke at said second position contracts said bore and transfers oil, and air if present, from said bore through said second passage to said purge outlet and back to said tank.

28. A mechanical lubricating oil pump comprising a pump body having a cylindrical chamber, a cylindrical rotator in said chamber, said rotator having a bore therein, a gear driving said rotator to rotate same, a piston axially reciprocal in said bore in said rotator, said piston having an outer end extending beyond said bore from one end of said rotator and having an inner end in said bore, a first cam engaging said outer end of said piston, a second cam engaging the other end of said rotator to cause relative movement between said piston and said rotator along a plurality of axial travel strokes changing the volume of said bore during each revolution of said rotator, comprising a first stroke expanding said bore, a second stroke contracting said bore, the length of said first and second strokes being determined by said first cam, a third stroke expanding said bore, a fourth stroke contracting said bore, the length of said third and fourth strokes being determined by said second cam, all four strokes occuring during each revolution of said rotator, said first and second strokes being longer than said third and fourth strokes to provide differential expansion and contraction of said bore during each revolution of said rotator, said first and second strokes providing oil and air purge input and output strokes, respectively, for purging air if present, said third and fourth strokes providing oil metering input and output strokes.

29. The invention according to claim 28 comprising means adjusting said second cam to adjust said third and fourth strokes to adjust the metered oil output of said pump.

30. The invention according to claim 28 wherein said adjusting means is responsive to external input.

31. The invention according to claim 28 wherein said rotator has a radial opening in a cylindrical sidewall thereof communicating with said bore, said pump body has an oil and air purge input passage communicating with said radial opening in said rotator during said first stroke, said pump body has an oil and air purge output passage communicating with said radial opening in said rotator during said second stroke, said pump body has an oil metering input passage communicating with said radial opening in said rotator during said third stroke, said pump body has an oil metering output passage communicating with said radial opening in said rotator during said fourth stroke, said other end of said rotator has a camming surface thereon with a high lobe portion and a low lobe portion engagable with said second cam to provide said third and fourth strokes corresponding respectively to one and the other of said high and low lobe portions.

32. The invention according to claim 31 wherein said second cam is rotatable about an axis perpendicular to the rotational axis of said rotator to adjust said third and fourth strokes to adjust the metered oil output of said pump, said second cam having an eccentric camming surface engagable with said camming surface at said other end of said rotator to effect said third and fourth strokes, rotation of said second cam causing shortening and lengthening of said third and fourth strokes to adjust said metered oil output.

33. The invention according to claim 32 wherein said other end of said rotator further includes a stop surface laterally spaced from said camming surface, and said second cam includes a stop surface aligned along the rotational axis of said rotator with said stop surface of said other end of said rotator, said second cam being rotatable to a full stroking position wherein said eccentric camming surface of said second cam engages said camming surface of said other end of said rotator at all times at either said high lobe portion or said low lobe portion, said second cam being rotatable to a minimum stroking position wherein said eccentric camming surface of said second cam engages said high lobe portion of said other end of said rotator during a portion of rotation of the latter, and said stop surface of said second cam engages said stop surface of said other end of said rotator during the remaining portion of rotation of the latter to prevent engagement of said camming surface of said second cam with said low lobe portion of said camming surface of said other end of said rotator and shorten the length of said third and fourth strokes.

34. The invention according to claim 33 wherein said stop surface of said second cam and said stop surface at said other end of said rotator are coaxially aligned along the axis of rotation of said, rotator.

35. The invention according to claim 34 wherein said camming surface at said other end of said rotator, including said high and low lobe portions, is concentric to said stop surface at said other end of said rotator.

36. The invention according to claim 33 wherein the height difference between said high lobe and low lobe portions of said camming surface at said other end of said rotator is smaller than the camming stroke length of travel of said piston effected by said first cam.

37. The invention according to claim 36 wherein the camming stroke length of travel between engagement of said high lobe portion of said camming surface at said other end of said rotator with said eccentric camming surface of said second cam and engagement of said stop surface at said other end of said rotator with said stop surface of said second cam is shorter than the height difference between said high and low lobe portions of said camming surface at said other end of said rotator.

38. A mechanical lubricating oil pump comprising a pump body having a cylindrical chamber, a cylindrical rotator in said chamber, said rotator having a bore therein, a gear driving said rotator to rotate same, a piston axially reciprocal in said bore in said rotator, cam means camming at least one of said piston and said rotator to cause relative movement therebetween along axial travel strokes changing the volume of said bore during each revolution of said rotator, said piston having an outer end extending beyond said bore from one end of said rotator having an inner end in said bore, said rotator having a radial opening in a cylindrical sidewall, thereof communicating with said bore, a first spring biasing said piston away from said one end of said rotator, to provide an axial biasing force, a second spring biasing said rotator in an axial direction aiding said bias of said first spring.

39. The invention according to claim 38 wherein said first and second springs extend axially from said one end of said rotator and parallel to each other.

40. The invention according to claim 39 wherein each of said first and second springs are spaced radially outwardly from the axis of rotation of said rotator.

41. The invention according to claim 39 wherein said first spring biases said plunger axially away from said one end of said rotator against an end wall of said pump body, and comprising a retainer at said end wall of said pump body and guiding said outer end of said plunger and also guiding said second spring.

42. The invention according to claim 41 wherein said retainer comprises a disc having a first opening receiving said outer end of said plunger, and having an axially extending boss receiving said second spring.

43. The invention according to claim 42 comprising a spindle extending from said one end of said rotator axially toward and into said boss of said retainer, and wherein said second spring circumferentially surrounds said spindle, and wherein said boss is an annular portion of said retainer extending axially between said second spring and said spindle.

* * * * *

UNITED STATES PATENT AND TRADEMARK OFFICE
CERTIFICATE OF CORRECTION

PATENT NO. : 4,971,532

DATED : November 20, 1990

INVENTOR(S) : GORDON C. SLATTERY

It is certified that error appears in the above-identified patent and that said Letters Patent is hereby corrected as shown below:

Claim 27, column 12, line 4, delete "26" and substitute therefor -- 23 --.

Signed and Sealed this

Seventh Day of April, 1992

*Attest:*

HARRY F. MANBECK, JR.

*Attesting Officer*

*Commissioner of Patents and Trademarks*